United States Patent [19]
McCurdy

[11] 3,869,189
[45] Mar. 4, 1975

[54] UNDERGROUND ELECTRICAL CONNECTOR

[76] Inventor: Bob C. McCurdy, P.O. Box 33427, White Bear, Minn. 55133

[22] Filed: Oct. 3, 1973

[21] Appl. No.: 403,161

[52] U.S. Cl............... 339/96, 174/77 R, 174/87, 339/116 C, 339/213 R, 339/272 A
[58] Field of Search......... H01r/13/52; 339/96, 116, 339/211, 213, 242, 272, DIG. 1; 174/87, 77 R

[56] References Cited
UNITED STATES PATENTS

| | | | |
|---|---|---|---|
| 2,932,685 | 4/1960 | Raila et al............................. | 339/96 |
| 3,395,382 | 7/1968 | Weagant........................ | 339/116 R |
| 3,515,798 | 6/1970 | Sievert.............................. | 174/135 |

Primary Examiner—Joseph H. McGlynn
Attorney, Agent, or Firm—Alexander, Sell, Steldt & DeLaHunt

[57] ABSTRACT

A multiple electrical conductor connector assembly in which a distribution cable and multiple feeder cables are connected at a metal terminal block. The cable ends are pushed through a rigid stress relief ring, then through undersized apertures in a resilient cylindrical adapter seal and are then connected to the terminal block. An elastic tubular cover having a closed end is placed over the terminal block and the adapter seal and shrunk-fit onto the adapter seal to form a watertight seal around the terminal block.

3 Claims, 2 Drawing Figures

PATENTED MAR 4 1975   3,869,189

UNDERGROUND ELECTRICAL CONNECTOR

FIELD OF THE INVENTION

The present invention relates to an underground electrical connector assembly for tapping feeder cables into a distribution cable.

BACKGROUND OF THE INVENTION

The esthetic desirability of having electrical service cables underground has created a great demand for such service. Underground cables are generally run between two ground level transformers. Periodically between the transformers, manholes are provided whereat feeder lines are tapped into the distribution line for service to homes, businesses, etc. Being underground, the connection of the feeder cables to the distribution cable must be protected by a water-tight seal.

In the prior art the cable ends have been connected in a terminal block which has then been potted in epoxy resin. This is extremely inconvenient in that it requires casting of the epoxy resin around the terminal block in the field. Another method has been to apply a sealing compound having the consistency of putty to the terminal block to surround it. A boot is applied around the sealant and connection and is thermally shrunk onto the connection and wrapped with tape to make it watertight. This method suffers from being complex, requiring a torch to heat the boot and being messy. Furthermore, neither of these methods permit the connection to be easily re-entered for adding or subtracting a feeder cable.

SUMMARY OF THE INVENTION

The present invention provides an underground multiple electrical conductor connector assembly comprising a resilient cylindrical adapter seal formed with a plurality of apertures extending therethrough parallel to its axis, each aperture having a normal diameter less than that of a specified cable and being expandable to receive the same. An electrically conductive metal terminal block connects the conductors at the ends of a distribution cable extending through the apertures in the adapter seal and the conductors at the ends of feeder cables pushed through the apertures in the adapter seal. A rigid stress relief ring is positioned adjacent the adapter seal to receive the cables prior to their conductors passing through the adapter seal. A cover having a closed end extends over the terminal block and forms with the adapter seal a water-tight seal around the terminal block.

The underground connector of the present invention is simple to apply and provides a quality watertight seal. It is also easily re-enterable.

THE DRAWING

In the drawing:

FIG. 1 is an elevational view partially in section of an underground electrical connector assembly constructed in accordance with the present invention at one stage in its assembly; and FIG. 2 is an elevational view of the connector assembly of FIG. 1 after its completion.

DESCRIPTION OF THE PREFERRED EMBODIMENT

Figure 1:
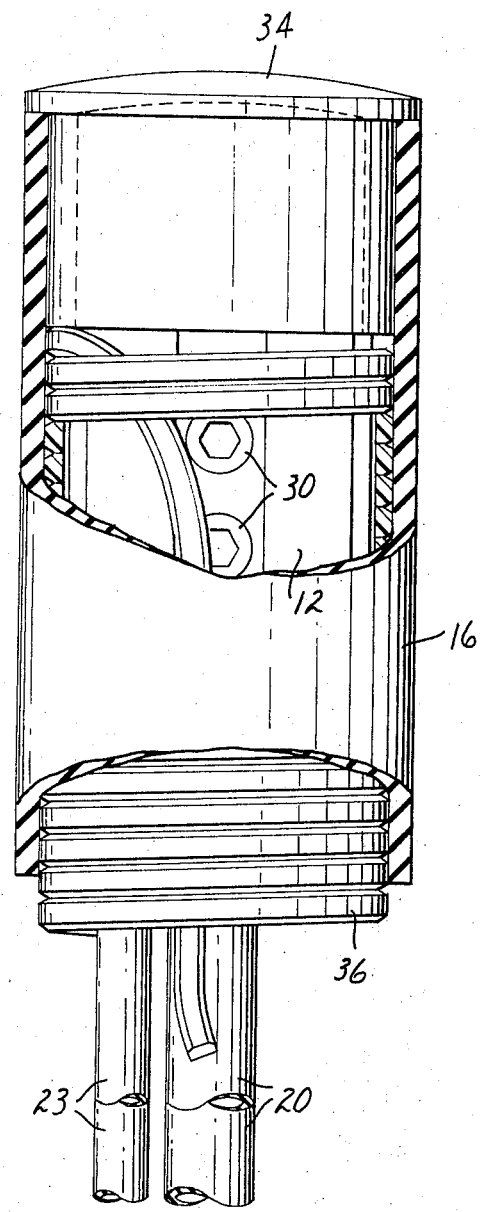
Figure 2:
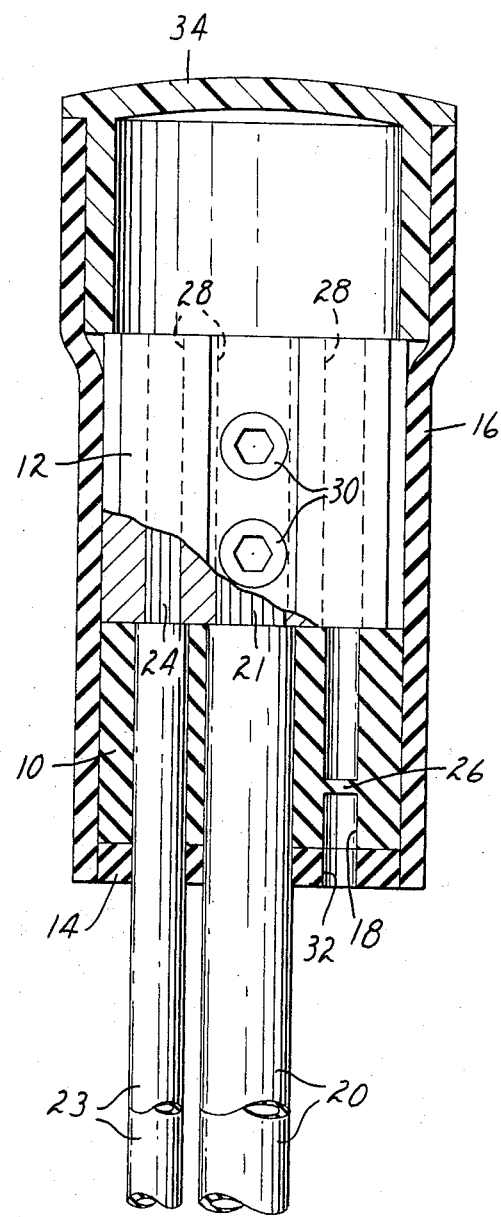

The underground electrical connector assembly of the present invention comprises a resilient cylindrical adapter seal 10, an electrically conductive metal terminal block 12, a rigid stress relief ring 14 and an elastic tubular cover 16.

The adapter seal 10 is formed with a plurality of apertures 18 extending therethrough parallel to its axis. Each aperture has a normal diameter less than that of a specified electrical cable (i.e., the conductor and the surrounding insulation material) and is expandable to receive that cable. In the illustrated embodiment the two central apertures are of a diameter to receive a distribution cable 20 thereby providing for both ends of the distribution cable. The remaining apertures are of a smaller diameter to receive feeder cables 23. The feeder cable apertures through the adapter seal 10 preferably have a thin rupturable membrane 26 formed across them to provide a watertight seal if no feeder cable is used with a particular aperture 18. The adapter seal is preferably formed of an ethylene-propylene-diene monomer to readily accept the cables 20 and 23 through apertures 18 and to seal tightly about them.

The terminal block 12 is generally cylindrical. It is formed with axially extending apertures 28 corresponding in location to the apertures 18 in the adapter seal 10 and having diameters slightly larger than the diameters of the corresponding conductor 21 or 24, of the cables 20 and 23, respectively. Set screws 30 are provided for each aperture 28 through the terminal block 12 to firmly retain the conductors 21 and 24 in position and to provide good electrical connection. The terminal block is preferably formed of aluminum or copper.

The stress relief ring 14 in the illustrated embodiment comprises a disk formed with a plurality of apertures 32 corresponding in alignment with the apertures 18 through the adapter seal 10. The apertures 32 in the disk 14 have diameters slightly larger than those of the corresponding cables 20 or 23. The disk 14 is positioned adjacent the adapter seal 10 on the opposite side thereof from the terminal block 12. The stress disk 14 defines a rigid stress relief ring around the cables 20 and 23 which permits bending of the cables 20 and 23 without fear of deforming the adapter seal 10. This guards against the possibility that bending of the cables 20 and 23 might otherwise deform the adapter seal 10 to such an extent that water might reach the terminal block 12 through one of the adapter seal apertures 18. The stress relief disk 14 is preferably made of a high density polypropylene.

The elastic tubular cover 16 in the illustrated embodiment is commercially available without the end cap 34 as 3M Brand PST (pre-stretched tubing) from the Minnesota Mining and Manufacturing Company with offices at Saint Paul, Minnesota. It is also described in U.S. Pat. No. 3,515,798. The cover 16 comprises an elastic sleeve which may be greatly stretched and yet has an excellent memory. In the commercial product the sleeve is in a highly stretched condition on a hollow core comprising a continuous narrow strip of tough flexible material in the form of a substantially rigid closed helix having adjacent coils interconnected. The end of the strip farthest within the cover 16 extends back through the core 36 and out of the open end thereof so that it may be pulled to remove the core progressively from the cover 16 to permit the cover 16 to shrink. On the core 36 the cover 16 may be stretched as much as 125% of its relaxed dimensions and when the core 36 is removed it will return to within 10% of its original dimensions.

The end cap 34 is formed of a rigid polymeric material, for example a high density polypropylene, and it is provided to close one end of the elastic tubular cover 16. The cap 34 has a hollow cylindrical sleeve which extends internally of the elastic cover 16 which is stretched into position thereon to form a water-tight seal. The elastic tubular cover is placed down over the terminal block 12, the adapter seal 10 and the stress relief disk 14. The core 36 is then pulled from the cover 16 permitting the cover to shrink onto the adapter seal 10 to form with the adapter seal a watertight seal around the terminal block. If desired the one end of the elastic tubular cover, instead of being closed by the end cap 34, may, for example, be closed by a second adapter seal or it may be closed by a plastic encased conductive adapter for connection directly to a transformer.

In use, the distribution cable 20 is cut in a manhole and the outer insulation is stripped back therefrom a distance sufficient to permit the cable to extend through the adapter seal 10 and the conductor 21 thereof to extend into the terminal block 12. A small amount of silicone grease is applied to the exposed distribution conductors 21 and the insulation at the ends of the distribution cable 20. The exposed conductor ends are then pushed through the central apertures 32 in the stress relief disk 14 and then into and through the larger central apertures 18 in the adapter seal 10 expanding the adapter seal apertures as the cables 20 are pushed therethrough. The ends of the distribution cable 20 are preferably pushed into the adapter seal 10 until the insulation thereof extends substantially through the adapter seal. In like manner one or more feeder cables 23 are stripped back and the conductor 24 and the insulation at the end thereof is lubricated with silicone grease and pushed through the appropriate apertures 32 in the stress relief disk 14 and the corresponding apertures 18 in the adapter seal 10. The silicone grease as well as aiding in pushing the cables 20 and 23 through the appropriate apertures 18 in the adapter seal 10 also assists in sealing around the cables to assure a watertight seal.

The terminal block 12 is next aligned with the conductors and moved axially to receive the conductors 21 and 24 in the apertures 28 formed through the terminal block 12. The set screws 30 are then tightened to retain the conductors in the terminal block 12 and to make good electrical connection.

Finally, the elastic cover 16 is brought down over the terminal block 12 and the adapter seal 10 and the free end of the strip forming the core 36 is grasped and pulled from the cover 16 to permit the elastic cover to shrink onto the adapter seal 10 and the stress relief disk 14 to retain the stress relief disk in position and to form with the adapter seal a water-tight seal around the terminal block 12.

If it is desired to re-enter the connector to add or subtract a feeder cable 23 it is only necessary to slit the elastic cover 16 to remove the same. The desired feeder-cable may then be added or subtracted and a new elastic cover 16 put into place as in the original assembly.

I claim:

1. A multiple electrical conductor connector assembly comprising:

a resilient cylindrical adapter seal formed with a plurality of apertures extending therethrough parallel to its axis, each said aperture having a normal diameter less than that of a specified cable and being expandable to receive the same, an electrically conductive metal terminal block connecting the conductors at the ends of a distribution cable extending through said apertures in said adapter seal and the conductors at the ends of feeder cables pushed through said apertures in said adapter seal to be tapped into said distribution cable, a rigid stress relief ring lying adjacent said adapter seal and receiving the cables prior to their passing through said adapter seal, and a cover having a closed end extending over said terminal block and forming with said adapter seal a watertight seal around said terminal block.

2. The connector assembly of claim 1 wherein said cover comprises an elastic tubular member closed at said one end by a rigid insulator cap having a hollow cylindrical sleeve extending coaxially with said elastic tubular member internally thereof.

3. The connector assembly of claim 1 wherein said adapter seal is formed with a watertight, rupturable membrane across at least one of its said conductor apertures.

* * * * *